United States Patent
Zhang et al.

(10) Patent No.: US 10,554,500 B2
(45) Date of Patent: Feb. 4, 2020

(54) MODELING ACCESS NETWORKS AS TREES IN SOFTWARE-DEFINED NETWORK CONTROLLERS

(71) Applicant: Futurewei Technologies, Inc., Plano, TX (US)

(72) Inventors: Jingjing Zhang, Plano, TX (US); Wei Wei, Plano, TX (US); Liurong Qian, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 27 days.

(21) Appl. No.: 15/725,035

(22) Filed: Oct. 4, 2017

(65) Prior Publication Data

US 2019/0104026 A1   Apr. 4, 2019

(51) Int. Cl.
*H04L 12/28* (2006.01)
*H04L 12/24* (2006.01)

(52) U.S. Cl.
CPC ........ *H04L 41/145* (2013.01); *H04L 41/0806* (2013.01); *H04L 41/12* (2013.01); *H04L 41/20* (2013.01)

(58) Field of Classification Search
CPC ... H04L 41/145; H04L 41/0086; H04L 41/12; H04L 41/20
USPC .................................................. 370/254–256
See application file for complete search history.

(56) References Cited

U.S. PATENT DOCUMENTS

| | | |
|---|---|---|
| 6,584,499 B1 | 6/2003 | Jantz et al. |
| 6,614,764 B1 * | 9/2003 | Rodeheffer ........... H04L 12/462 370/254 |
| 6,760,324 B1 | 7/2004 | Scott et al. |
| 7,983,207 B2 * | 7/2011 | Lai ........................ H04L 45/22 370/312 |
| 8,000,267 B2 * | 8/2011 | Solis ...................... H04L 45/54 370/256 |
| 9,648,547 B1 | 5/2017 | Hart et al. |

(Continued)

FOREIGN PATENT DOCUMENTS

| | | |
|---|---|---|
| CN | 103281707 A | 9/2013 |
| CN | 106059821 A | 10/2016 |

(Continued)

OTHER PUBLICATIONS

International Search Report dated Jan. 4, 2019 in PCT Application No. PCT/CN2018/107786, 10 pages.

(Continued)

*Primary Examiner* — Thai D Hoang
(74) *Attorney, Agent, or Firm* — Vierra Magen Marcus LLP

(57) ABSTRACT

A network model is provided for modeling the nodes in networks such as access networks having a tree topology. Using the model, a network description can be generated that includes a node description for each node in the access network. A node description for a node includes an extra field to define child nodes relative to a modeled node. The node description also includes an extra field to describe a link from a modeled node to an upstream node. The connecting links and intermediate nodes of access nodes are exposed and can be manipulated. By providing a node description with child and link fields, a separate link data store can be avoided.

22 Claims, 15 Drawing Sheets

(56) References Cited

U.S. PATENT DOCUMENTS

| | | | |
|---|---|---|---|
| 2002/0101875 A1* | 8/2002 | Lui | H04L 12/462 370/402 |
| 2003/0140165 A1* | 7/2003 | Chiu | H04L 45/02 709/238 |
| 2003/0193959 A1* | 10/2003 | Lui | H04L 12/462 370/401 |
| 2004/0160907 A1* | 8/2004 | Perlman | H04L 63/0428 370/319 |
| 2014/0325038 A1 | 10/2014 | Kis | |
| 2015/0043576 A1 | 2/2015 | Dixon et al. | |
| 2015/0088827 A1 | 3/2015 | Dixon et al. | |
| 2015/0103844 A1 | 4/2015 | Zhao et al. | |
| 2016/0050104 A1 | 2/2016 | Wackerly et al. | |
| 2016/0135111 A1 | 5/2016 | Huang et al. | |
| 2016/0218917 A1 | 7/2016 | Zhang et al. | |
| 2016/0277959 A1 | 9/2016 | Venkataraman et al. | |
| 2016/0380807 A1 | 12/2016 | Shevenell et al. | |
| 2017/0026294 A1 | 1/2017 | Basavaraja et al. | |
| 2017/0099156 A1 | 4/2017 | Qiu et al. | |
| 2017/0237605 A1 | 8/2017 | Koponen et al. | |
| 2017/0289020 A1 | 10/2017 | Zhao | |
| 2018/0167307 A1 | 6/2018 | Barry et al. | |
| 2018/0307522 A1 | 10/2018 | Wu et al. | |
| 2018/0324093 A1 | 11/2018 | Namjoshi et al. | |
| 2019/0028577 A1 | 1/2019 | D?Souza et al. | |

FOREIGN PATENT DOCUMENTS

| | | |
|---|---|---|
| CN | 106059921 A | 10/2016 |
| WO | 2016120690 A1 | 8/2016 |

OTHER PUBLICATIONS

Zhang, et al, "Topology-Aware Controller Associations in Software-Defined Networks", filed on Sep. 22, 2017, U.S. Appl. No. 15/712,886, 47 Pages.

Zhang, et al, "Controller Communications in Access Networks", filed on Oct. 3, 2017, U.S. Appl. No. 15/724,080, 41 Pages.

Berde et al., ONOS: Towards and Open, Distributed SDN OS, HotSDN'14, Aug. 22, 2014, 6 Pages.

Hock et al., Pareto-Optimal Resilient Controller Placement in SDN-based Core Networks, 25th International Teletraffic Congress (ITC), 2013, 9 Pages.

Muller et al., Survivor: an Enhanced Controller Placement Strategy for Improving SDN Survivability, Globecom, 2014, 7 Pages.

Panda et al., SCL: Simplifying Distributed SDN Control Planes, 14th USENIX Symposium on Networked Systems Design and Implementation (NSDI' 17), Mar. 27-29, 2017, 19 Pages.

Office Action dated Feb. 26, 2018, in U.S. Appl. No. 15/724,080.
Office Action dated Jun. 14, 2019, in U.S. Appl. No. 15/712,886.
Response to Office Action filed Jun. 26, 2018, in U.S. Appl. No. 15/724,080.

* cited by examiner

```
module: ietf-network-topology
augment /nd:networks/nd:network:
   +--rw link* [link-id]
      +--rw source
      |   +--rw source-node?    -> ../../../nd:node/node-id
      |   +--rw source-tp?      -> ../../../nd:node[nd:node-id=current()/
      |                            ../source-node]/termination-point/tp-id
      +--rw destination
      |   +--rw dest-node?      -> ../../../nd:node/node-id
      |   +--rw dest-tp?        -> ../../../nd:node[nd:node-id=current()/
      |                            ../dest-node]/termination-point/tp-id
      +--rw link-id             link-id
      +--rw supporting-link* [network-ref link-ref]
         +--rw network-ref      -> ../../../nd:supporting-network/
         |                         network-ref
         +--rw link-ref         -> /nd:networks/network
                                   [nd:network-id=current()/../network-ref]/
                                   link/link-id
augment /nd:networks/nd:network/nd:node:
   +--rw termination-point* [tp-id]
      +--rw tp-id               tp-id
      +--rw supporting-termination-point* [network-ref node-ref tp-ref]
         +--rw network-ref     -> ../../../nd:supporting-node/network-ref
         +--rw node-ref        -> ../../../nd:supporting-node/node-ref
         +--rw tp-ref          -> /nd:networks/network[nd:network-id=
                                   current()/../network-ref]/node+
                                   [nd:node-id=current()/../node-ref]/
                                   termination-point/tp-id
```

Link Model / Node Model

*FIG. 7*

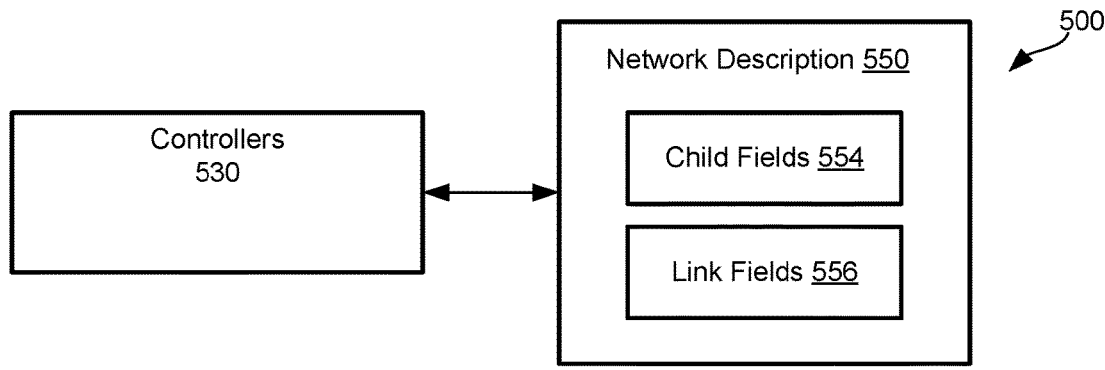
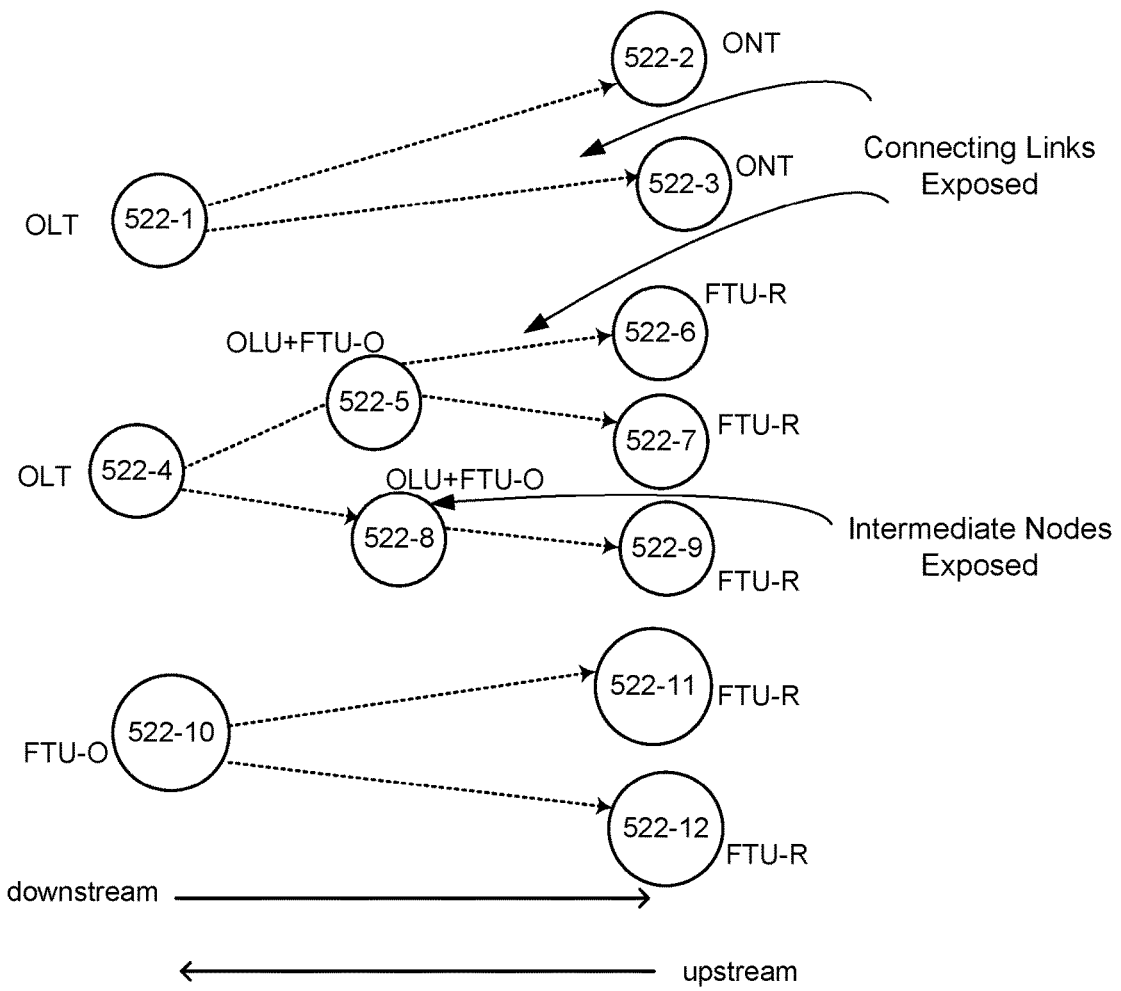
FIG. 10

```
module: ietf-access-network-topology
augment /nd:networks/nd:network/nd:node:
  +--rw tp-id       tp-id
  +--rw children* [node-ref] -> ../node/node-id
  +--rw distance  //Leaf node, distance between this node and its parent
  +--rw additional-yang  //reference to yang model of vendor A's device.
  +--rw supporting-termination-point *  //...underlay network and node
```

Supplement Model Field

FIG. 12

MODELING ACCESS NETWORKS AS TREES IN SOFTWARE-DEFINED NETWORK CONTROLLERS

BACKGROUND OF THE INVENTION

Data networks include network nodes, such as routers, switches, bridges, and other devices that transport data through the network. Software defined networks (SDN) include network technology that provides customization and optimization not often available with traditional network management. Networks, such as data center networks, enterprise networks, and carrier networks, may include one or more SDNs.

An SDN simplifies modern networks by decoupling the data-forwarding capability (e.g. a data plane) from routing, resource, and other management functionality (e.g. a control plane) previously performed in the network nodes. Network nodes that support software-defined networking may be configured to implement the data plane functions, while the control plane functions may be provided by an SDN controller. Open application programming interface (API) services, such as the OpenFlow protocol, may manage the interactions between the data plane and control plane and allow for the implementation of non-vendor specific combinations of networking nodes and SDN controllers within a network. As a result, software-defined networking in conjunction with an Open API service may provide numerous benefits to modern networks that include increased network virtualization, flexible control and utilization of the network, and customization of networks with specific requirements.

While SDNs provide many advantages over traditional network management options, they can also present challenges. An SDN controller typically controls and manages control plane functions for many distributed network nodes. Each node may have a particular set of devices, connections to other nodes in the network, and control and management capabilities.

Access networks, including fixed access and wireless access networks, are usually of tree topologies, distributing user traffic from the root of the tree to the leaves of the tree.

SUMMARY

According to one aspect of the present disclosure, there is provided a device that includes: a non-transitory memory storage comprising instructions; and one or more processors in communication with the memory, wherein the one or more processors execute the instructions to: access network information for an access network having a tree topology including a plurality of nodes and a plurality of links, wherein each pair of connected nodes of the plurality includes a single connecting link, each node being associated with at least one device; generate a network description for the access network based on a node model for a tree topology, the network description including for a first node at least one child field defining any downstream nodes relative to the first node and a link field defining a distance between the first node and an upstream node to which it is connected; and store the network description for access by at least one controller to manage control plane functions in the access network.

Optionally, in any of the preceding aspects, the one or more processors execute the instructions to: access from a node data store the network description; calculate a source-destination path between two nodes of the plurality based on the network description; wherein calculating the source-destination path includes determining link information between nodes in the source-destination path based on one or more link fields in the network description.

Optionally, in any of the preceding aspects, the one or more processors execute the instructions to: provide from a first controller configuration information for the source-destination path, wherein the configuration information is provided to a set of nodes in the source-destination path.

Optionally, in any of the preceding aspects, calculating the source-destination path is performed without accessing a link data store to determine links between nodes in the access network.

Optionally, in any of the preceding aspects, the plurality of nodes form a first tree structure having a root node.

Optionally, in any of the preceding aspects, the node model includes a parent field for identifying an upstream node to which a selected node is connected.

Optionally, in any of the preceding aspects, the access network is an access network for a wireless communication system; and the access network provides connectivity between a plurality of client devices and at least one external network.

Optionally, in any of the preceding aspects, the one or more processors execute the instructions to: receive at least one event associated with the access network and a first application, the at least one event identifying a first intermediate node and a first connecting link; and in response to the at least one event, manipulate the first intermediate node and the first connecting link.

Optionally, in any of the preceding aspects, the one or more processors execute the instructions to: receive at least one event associated with the access network; and in response to the at least one event, configure by a first controller a data path including two or more nodes of the plurality of nodes based on the network description.

Optionally, in any of the preceding aspects, wherein generating the network description includes: providing at least one additional field referencing a supplemental model; and wherein the supplemental model is a device model corresponding to a device deployed at a first node.

Optionally, in any of the preceding aspects, wherein the one or more processors execute the instructions to: receive at least one event associated with the access network; modify at least one device in the access network based on the event; and update the network description for one or more nodes associated with the at least one device; wherein updating the network description includes updating one or more link fields.

Optionally, in any of the preceding aspects, the one or more processors execute the instructions to: transmit the network description to a first controller at a first device and a second controller at a second device, the first controller controlling a first subset of nodes in the access network and the second controller controlling a second subset of nodes in the access network.

Optionally, in any of the preceding aspects, a centralized controller generates the network description and outputs the network configuration to the first controller and the second controller.

According to one aspect of the present disclosure, there is provided a system, comprising: an access network comprising a plurality of nodes and a plurality of links between a subset of the nodes, each node is associated with at least one device, the access network providing connectivity between a plurality of client devices and a service provider; a processor coupled to the software-defined access network and configured to generate a node description for a first node of the software-defined access network, the node description defining at least one downstream node relative to the first node and indicating a distance between the first node and an upstream node; and a storage device configured to receive and store the node description for the first node.

Optionally, in any of the preceding aspects, the system further comprises a controller coupled to the storage device; and a control link between the controller and the first node; wherein the controller is configured to receive a request and access the node description to perform a data path calculation including the first node.

Optionally, in any of the preceding aspects, the processor is configured to generate the node description including: providing at least one additional field referencing a supplemental model for the first node.

Optionally, in any of the preceding aspects, the processor is configured to: receive at least one event associated with the software-defined network; modify at least one device in the software-defined network based on the request; and update a node description for one or more nodes associated with the at least one device; wherein updating the node description includes updating one or more link fields.

According to one aspect of the present disclosure, there is provided, a computer-implemented method for network management, comprising: providing an access network comprising a plurality of nodes and a plurality of links between a subset of the nodes, each node is associated with at least one device, the access network providing connectivity between a plurality of client devices and at least one external network; accessing by a controller a network description for the access network, the network description including a node description for each of the plurality of nodes, wherein the node description for each node includes a child field defining downstream nodes connected to the node and a link field defining a distance between the node and an upstream node; and generating by the controller a source-destination path between a leaf node and a root node in the access network in response to a client request, the controller configured to access the node description for at least the leaf node and the root node to determine connecting links based on link fields in the node description for the leaf node and the root node.

Optionally, in any of the preceding aspects, the method further comprises: receiving at the controller at least one event associated with the software-defined network; modifying, with the controller, at least one device in the software-defined network based on the request; and updating, with the controller, the node description for one or more nodes associated with the at least one device; wherein updating the node description includes updating one or more link fields.

According to one aspect of the present disclosure, there is provided a non-transitory computer-readable medium storing computer instructions for network management, that when executed by one or more processors, cause the one or more processors to perform the steps of: access network information for a plurality of nodes and a plurality of links connecting at least a subset of the nodes, each node being associated with at least one device; generate a network description for a software-defined access network including a node description for each of the plurality of nodes, a first node description including at least one child field defining at least one downstream node relative to a first node, the first node description including a link field indicating a distance between the first node and an upstream node; and output the network description for use by at least one controller to manage control plane functions for the software-defined network.

Optionally, in any of the preceding aspects, generating the network description includes: generating at least one additional field referencing a supplemental model.

Optionally, in any of the preceding aspects, the one or more processors perform the step of: configure by a first controller a data path including two or more nodes of the plurality of nodes based on the network description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 7 is a table showing an example of a network description that may be created and used by a network controller to manage an SDN.

FIG. 10 is a block diagram depicting an example of a SDN modeled in accordance with one embodiment.

FIG. 12 is a table depicting a data structure for a node model including a supplemental field.

DETAILED DESCRIPTION

Figure 1:
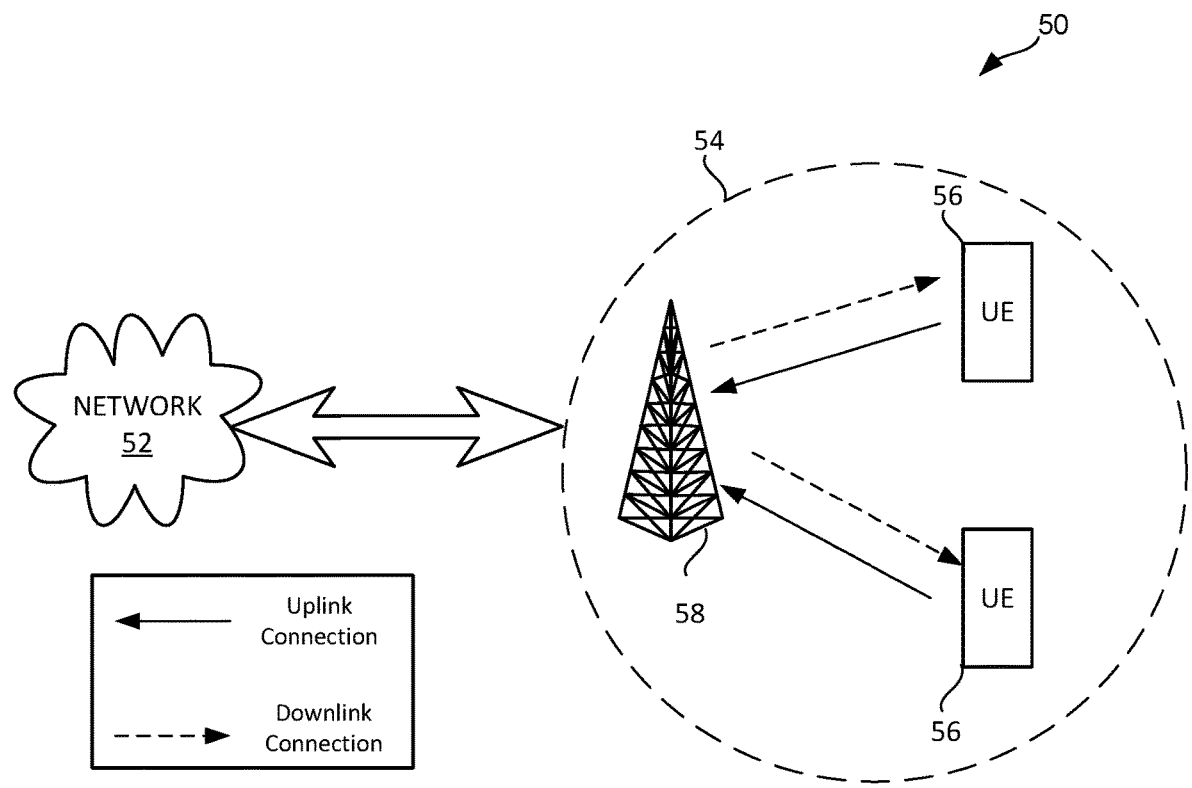
FIG. 1 illustrates a network environment for communicating data.

The disclosed technology relates to computer networks, and more particularly to network descriptions for networks such as software-defined networks (SDNs). SDNs typically include a plurality of nodes and a plurality of links between some of the nodes. For example, a software-defined access network may provide connectivity between a plurality of user equipment (e.g., client devices) and the access network and one or more service providers or external networks. The disclosed technology includes a network model that models the nodes in a network as a tree. In a tree topology, a subset of connected nodes is modeled as a branch of a tree which has no edges to connect the subset of nodes to the nodes of other branches of the tree. In this manner, the branches of the tree may not directly communicate. This tree structure, which accurately describes networks such as access networks, is simpler to describe than a general graph.

In one embodiment, a network model is provided that includes a node model. The node model includes fields to define the child nodes relative to a modeled node. The node model also includes an extra field to describe a link from the modeled node to an upstream node. This technique permits modeling without using a separate link model as in traditional techniques. Additionally, the connecting links and intermediate nodes of access nodes are exposed and can be manipulated which may not be possible using techniques that model access networks as simple switches.

In one embodiment, a server accesses network information that describes an SDN. The network information may be physical topology information that is accessed by receiving topology information from nodes in the SDN, by polling nodes in the SDN, or by reading preexisting topology information. A network description such as a software-defined description for the SDN is generated, including a node description for each of the nodes in the SDN. Some of the node descriptions may include child fields and/or link fields to describe the physical topology of the network. A child field in the node description defines one or more downstream nodes relative to the modeled node of the node model. A link field indicates a distance between the modeled node and an upstream node relative to the modeled node. A node description may include one or more child fields to define one or more child nodes relative to the modeled node. A node model may include one or more link fields to define links between the modeled node and an upstream node.

Traditionally, network topologies have been modeled as graphs that enable controllers to be able to describe any type of network. Often, controllers are designed to model any network topology. When controllers are designed generically to be able to describe any type of network, they may fail to consider the uniqueness of a particular network. For example, the tree topology of an access network traditionally has not been considered in modeling access networks. Some controllers or hardware abstraction layers may model access networks as a simple switch that aggregates upstream user traffic and distributes downstream user traffic. Modeling an access network as a switch having a set of input ports and a set of output ports may simplify modeling. However, such a model hides the intermediate nodes within the access network, as well as the connecting links between nodes in the access networks.

The disclosed technology models an access network as a tree using child and link fields that expose the connecting links and intermediate nodes of the access network. In this manner, applications can access the connecting links and intermediate nodes. For example, applications can manipulate connecting links and manage and control intermediate nodes in the access network. Additionally, the controller can cover a more broad definition of access networks, potentially all the way to the end user equipment such as a user computer or mobile device (e.g., cellphone).

By modeling a network using node models with child fields and link fields, a separate link model may be omitted. In this manner, a controller may upgrade and/or modify a device at a node by updating a node store only. This enables faster processing in the control plane. For example, data path calculations between two nodes may be faster. In traditional implementations, the link description for each link in the path is accessed from a link data store, and all nodes for each link are searched in a node data store to determine the data path. By providing child and link fields in node descriptions, only the node descriptions for the involved nodes are accessed. From the node descriptions, the connecting links are determined.

According to one embodiment, a single database store is used to store the full topology information of a network with a tree topology. This simplified approach provides a more efficient modeling technique, and faster network operations using a network description, when compared with modeling techniques that utilize multiple database stores for node descriptions and link descriptions.

In one embodiment, a node model may be customized to introduce different properties of nodes in the access network using a tree model. For example, an additional field may be introduced that references a particular model for a particular node type. In this manner, the model may describe any complicated access network that includes devices from any vendor.

FIG. 1 illustrates a network environment 50 for communicating data. Network 50 includes a base station 58 including one or more antennas having a coverage area 106. Base station (BS) 58 may include a communications controller. Network environment 50 includes a plurality of user equipments (UEs) 56, and a network 52 such as a backhaul network. Two UEs are depicted, but many more may be present. A communications controller at base station 58 may be any component capable of providing wireless access by, inter alia, establishing uplink (dashed line) and/or downlink (dotted line) connections with UEs 56. Base station 58 may include an enhanced base station (eNB), a picocell, a femtocell, and other wirelessly enabled devices. UEs 56 may be any component capable of establishing a wireless connection with BS 58, such as cell phones, smart phones, tablets, sensors, etc. Network 52 may be any component or collection of components that allow data to be exchanged between BS 58 and a remote end (not shown). In some embodiments, the network 52 may comprise various other wireless devices, such as relays, femtocells, etc.

Figure 2:
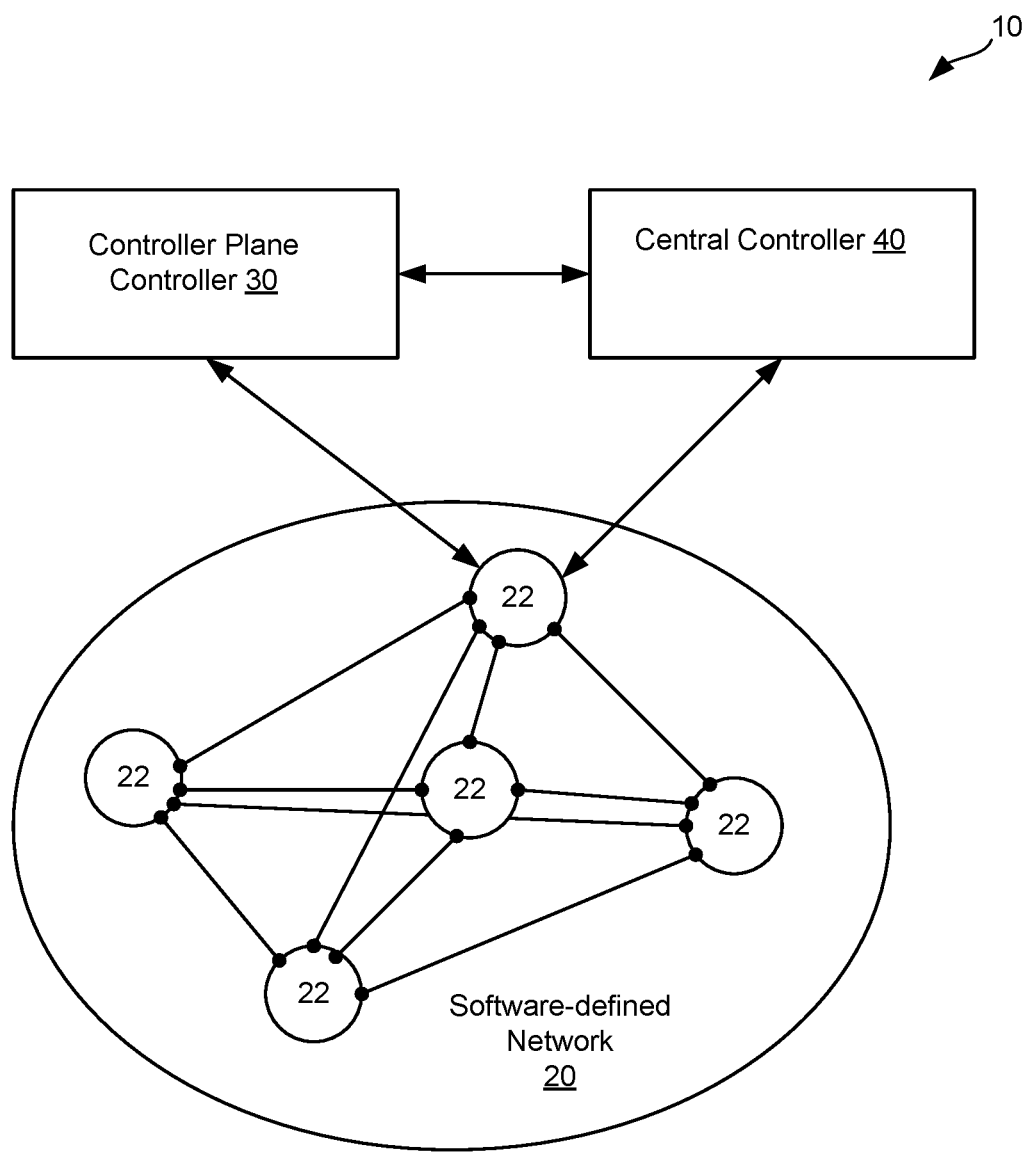
FIG. 2 is a block diagram of an example of a network environment.

FIG. 2 is a block diagram of an example of a network environment 100 in which embodiments of the disclosed technology may be practiced. The network environment comprises a software-defined network (SDN) 110, at least one control plane controller 120, and at least one central controller 40. The SDN 110, the control plane controller 120, and the central controller 130 communicate with each other via optical, electrical, or wireless means. Although controller 120 is shown separate from SDN 110, controller 120 may be implemented in the SDN 110 at one of nodes 112, for example. Controller 120 may be implemented in a server or other computing device at one of nodes 112, or a computing device remote from SDN 110.

An SDN controller may be operated based on the Openflow protocol. An SDN is a network technology that provides programmable central control of network traffic without requiring physical access to the network's devices. SDNs may employ Internet Protocol (IP) networks utilizing Trans-mission Control Protocol/Internet Protocol (TCP/IP). SDNs may decouple the data-forwarding capability, e.g., the data plane, from routing, resource, and other management functionality, e.g., the control plane, previously performed in the network nodes. Decoupling the control plane from the data plane of the network enables the network controller to efficiently control the network traffic through globally optimized traffic engineering and routing, which departs from locally optimized shortest path first. SDN may also simplify network operations or even have the capabilities to flatten the network with extended data routing vectors.

A controller may be designed that controls and manages an entire network such as an access network (e.g., including GPON, EPON, G.Fast, etc.). Examples of SDN controllers include ONOS (open network operating system) and ODL (Open Daylight). Controllers may utilize protocols including netconf, openflow, or private vendor protocols. In some examples, a hardware abstraction layer is provided between provide vendor devices and the SDN controller. Voltha is an example of a hardware abstraction layer that can be provided. In some examples, Openflow and/or Netconf protocols may be used to communicate between a VOLTHA hardware abstraction layer and an ONOS or ODL controller.

In one embodiment, SDN 20 can be implemented as an access network that provides connectivity between user equipment 56 and network 52. For example, SDN 20 may include a plurality of network nodes that provide multiple configurable data paths to provide connections between user equipment 56 and network 52.

In one embodiment, the SDN 20 is a packet switched network, where data traffic is transported using packets or frames along network paths or routes. The packets may be routed or switched along a traffic engineered label switched paths established by a signaling protocol, such as multiprotocol switching (MPLS) or Generalized MPLS (GMPLS), based on a path computed by the controller 30 and/or developed by the nodes 22. The SDN 20 comprises a plurality of nodes 22 coupled to one another using optical, electrical, or wireless links. The SDN 110 may also comprise a plurality of domains, such as autonomous system (AS) domains or IGP areas, which may each comprise a set of network elements corresponding to the same address management and/or path computational responsibility. The domains are organized via physical mechanisms (e.g. location, connections, etc.) and/or logical means mechanisms (e.g. network topology, protocols, communication layers, etc.). The different domains are coupled to each other and each comprises some of the nodes 22.

Nodes 22 are any devices or components that support transportation of the packets through the SDN 20. For example, the nodes 22 may include bridges, switches, routers, or various combinations of such devices. The nodes 22 may include a plurality of ingress ports for receiving packets from other nodes 22, logic circuitry that determines which nodes 22 to send the frames to, and a plurality of egress ports for transmitting frames to the other nodes 22. In some embodiments, at least some of the nodes 22 are label switched routers (LSRs), which are configured to modify or update the labels of the packets transported in the label switched network 20. In some embodiments, some of the nodes 22 are label edge routers (LERs). For example, the nodes 22 at the edges of the SDN 20 are configured to insert or remove the labels of the packets transported between the label switched network 110 and external networks. The first node 22 and the last node 22 along a path are sometimes referred to as the source node or head end node and the destination node or tail end node, respectively. Although four nodes 22 are shown in the SDN 20, the SDN 20 may comprise any quantity of nodes 22. Additionally, the nodes 22 may be located in different domains in the SDN 20 and may be configured to communicate across multiple domains. For example, the nodes 22 that correspond to different domains may exchange packets along a path that is established across multiple domains.

The control plane controller 30 is any device configured to coordinate activities within the SDN 20. Controller 30 may include a Network Management System (NMS) or Operations Support System (OSS). Specifically, the control plane controller 30 receives routing requests from the SDN 30 and returns the corresponding path information. The control plane controller 30 may perform path computation and forward the computed path to at least one of the nodes 22. The control plane controller 30 may be located in a component outside of the SDN 30, such as an external server, or may be located in a component within the SDN 110, such as in a server at a node 22.

The central controller 40 is any device configured to coordinate activities by the control plane controllers 30, for example where multiple control plane controllers are used to manage control plane functions within the SDN 20. The central controller 40 may be located in a component outside of the SDN 20, such as an external server, or may be located in a component within the SDN 20, such as in a server at a node 22. In one embodiment, a central controller performs the processes described herein to generate a network configuration. The network configuration can be provided to one or more control plane controllers 30.

The control plane controller may include or communicate with a path computation engine (PCE), not shown. A PCE is any device or component configured to perform all or part of the path computation for the SDN 20, e.g. based on a path computation request. The PCE can receive information for computing a path from the control plane controller 30, from the node 22, or both. The PCE processes the information to obtain the path. For instance, the PCE computes the path and determines the nodes 22 including the LSRs along the path. The PCE may then send all or part of the computed path information to the control plane controller 30 or directly to at least one node 112. Further, the PCE 130 is typically coupled to or comprises a traffic-engineering database (TED), a P2MP Path database (PDB), a P2P path database, an optical performance monitor (OPM), a physical layer constraint (PLC) information database, or combinations thereof, which may be used to compute the path. The PCE may be located in a component outside of the SDN 20, such as an external server, or may be located in a component within the SDN 20, such as at node 22. The PCE may be configured as part of the control plane controller 30. Alternately, the PCE may be configured as part of the central controller 40.

A path computation request is sent to the PCE by a requesting device. The requesting device is any client application requesting a path computation to be performed by the PCE. The requesting device may also be any network component that makes such a request, such as the control plane controller 30, or any node 22, such as a LSR. For instance, the requesting device may request from the PCE a P2MP path or P2P path in a single domain or across multiple domains in SDN 20. Additionally, the requesting device may send the PCE at least some of the path required information, for example via a path computation request and/or through broadcast signaling via link state advertisements (LSAs), etc.

Figure 3:
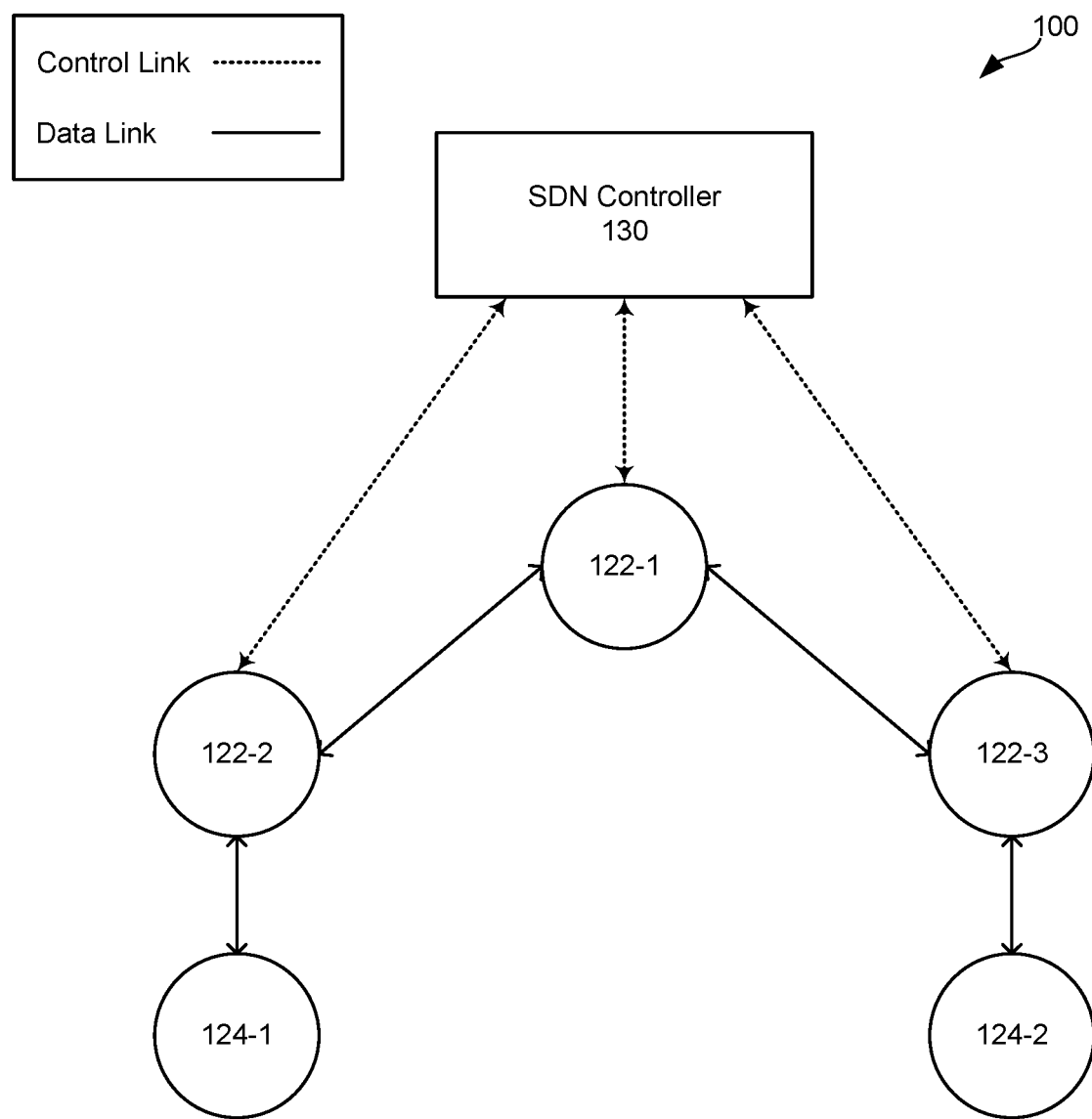
FIG. 3 is a schematic diagram of an example embodiment of a software-defined network (SDN) network.

FIG. 3 is a schematic diagram of an example embodiment of an SDN network 100. The network 100 comprises an SDN controller 130, a plurality of network nodes 122, and a plurality of end nodes 124. The network nodes 122 comprise switches, routers, bridges, and/or any other device that is used to receive and/or forward data in a network. The control path is represented by dashed lines and the data path is represented by solid lines. System configuration, management information, and routing/forwarding table information are exchanged between the network controller 130 and the network nodes 122 via the control path.

Data packets are received from end nodes 124 and forwarded between network nodes 122 via the data path. For example, data from end node 124-1 acting as a publisher are received at network node 122-2 acting as an Ingress Border Router (IBR), routed through network node 122-1 acting as a Transit Router (TR), and passed to end node 124-2 acting as a destination node using network node 122-3 acting as an Egress Border Router (EBR). A border router is a router on the edge of an SDN domain that is connected to at least one node outside of the SDN domain, the IBR is an SDN border router that receives traffic from outside of the SDN domain, and the EBR is an SDN border router that sends traffic outside of the SDN domain. The TR is an SDN router that transports traffic within the SDN domain and has no interfaces connected to outside of the SDN domain. A single border router may function as an IBR, an EBR, or both, depending on traffic flow(s) transported through the LSPs. The end nodes 124 are any network elements configured to transmit, receive, originate, and/or terminate data, or, in alternate embodiments, other networks, e.g., IP networks, MPLS networks, etc. In some embodiments, the network controller 130 is a generalized network controller configured to control the network nodes 122 and end nodes 124. The network controller 130 is any device configured to perform control path and/or control plane functionality, such as creating a network map and defining the information in a routing table that defines how to route incoming packets. The network controller 130 is also configured for management and control functionality of the control plane, which includes routing and resource management. The network nodes 122 and end nodes 124 include devices that receive and transmit data through the network 200 according to a standard. At least some of the network nodes 122 and end nodes 124 and network controller 130 may conform to a standard, e.g. as defined by Open Networking Foundation (ONF) document OpenFlow Switch Specification version 1.3.4, ONF document Openflow Controller Switch NDM Synchronization version 1.0, and ONF document Software-Defined Networking: The New Norm for Networks, ONF Whitepaper (collectively Openflow).

The controller 130 receives data from, and transmits messages to, the network nodes. Some of the incoming messages or parts of the incoming messages are translated into a standard independent format for processing by some of the modules in the network controller 130. The standard independent format is based on an abstract network control data model that provides an abstraction of the attributes or features of the various standard formats. The network controller 130 interacts with the network nodes via a variety of application programming interface (API) protocols, e.g., Openflow. The controller determines the global network topology of the network. With the global network topology, state information, dynamic traffic flow/volume information, and other network state information, the network controller makes decisions on how to assign resources and route applications, information, and/or data packet flows through the network.

Figure 4:
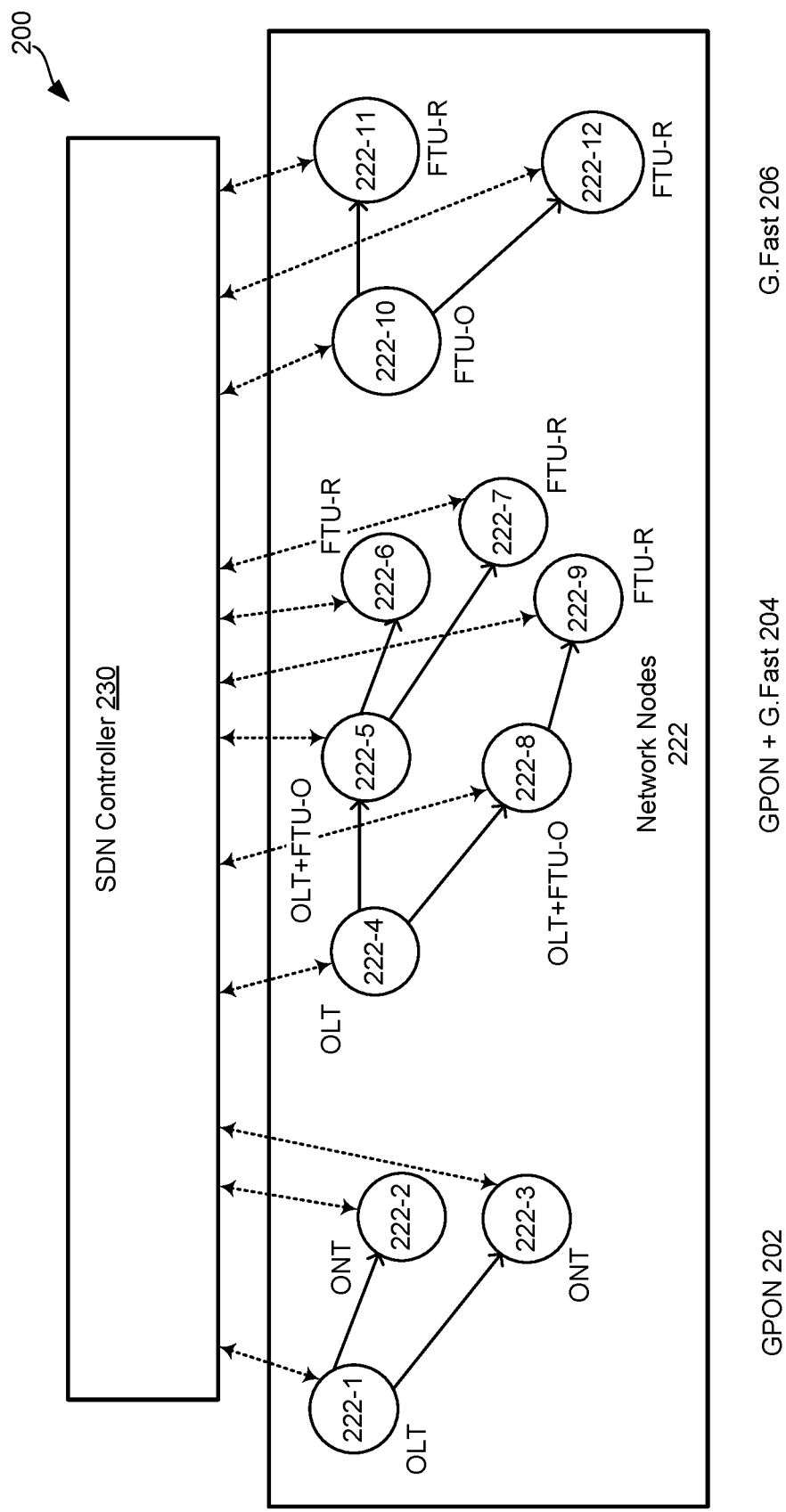
FIG. 4 is a block diagram of an example of a SDN.

FIG. 4 is a block diagram of another example of an SDN 200 including an SDN controller 230 and a plurality of network nodes. SDN 200 may be an access network in one example, with controller 230 designed to manage and control the entire access network. In the particularly described example, the access network includes a GPON (Gigabit Passive Optical Network) subnetwork 202, a GPON+G.Fast (digital subscriber line protocol standard) subnetwork 204, and a G.Fast network 206. The GPON subnetwork includes an optical line terminal node (OLT) 221-1 and two optical network terminal (ONT) nodes 222-2 and 222-3. The GPON+G.Fast network includes an OLT node 222-4, two intermediate OLT+FTU-O nodes 222-5 and 222-8, and three FTU-R nodes 222-6, 222-7, and 222-9. The G.Fast network includes an FTU-O node 222-10 and two FTU-R nodes 222-11.

Figure 5:
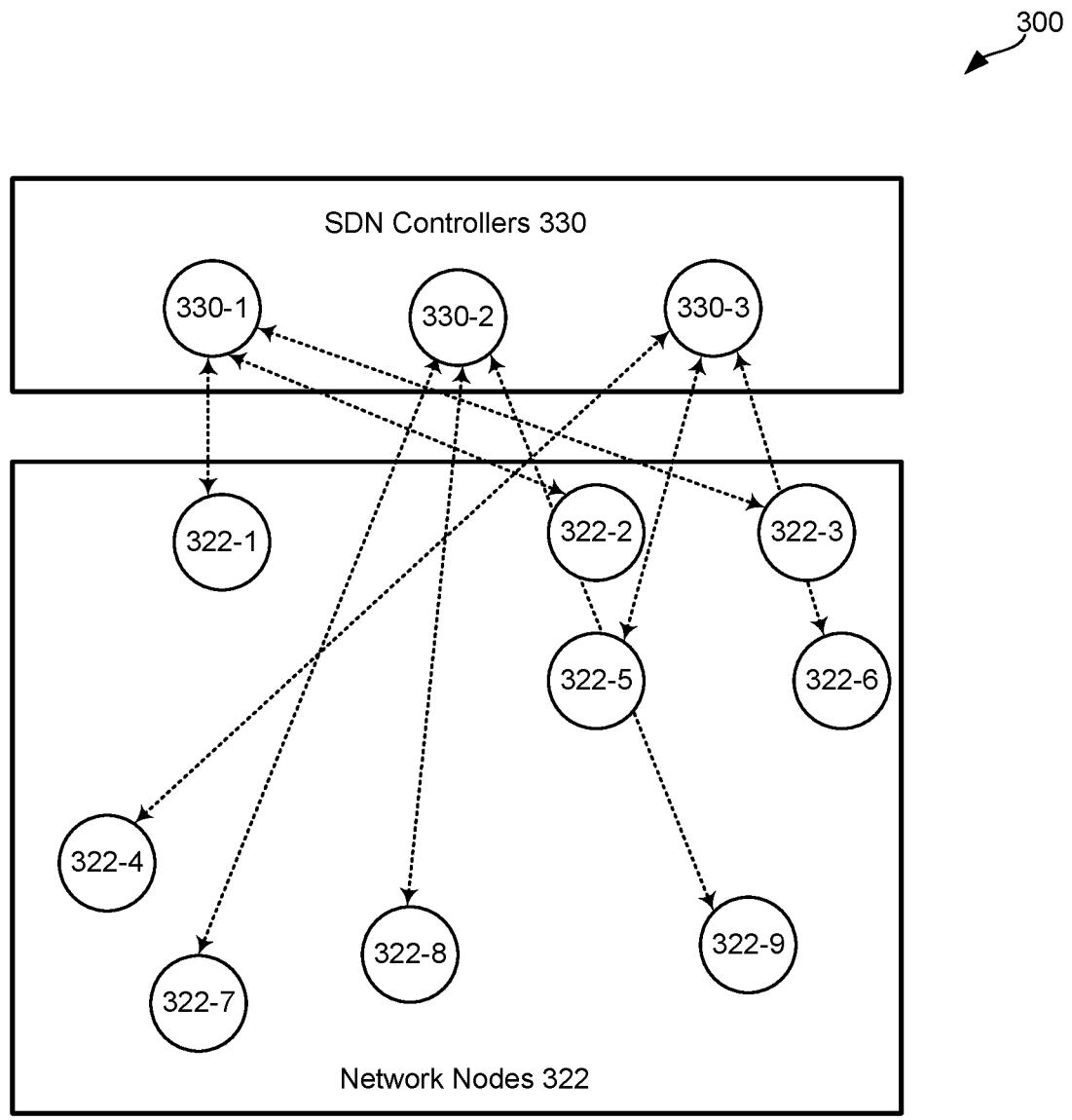
FIG. 5 is a block diagram of an example of a network environment including multiple controllers.

FIG. 5 is a block diagram of another example of a network environment 300 including multiple SDN controllers 330 for managing and controlling a plurality of network nodes 322. Multiple controllers may be used in implementations with a large number of network nodes to be managed, as well as to provide high availability. In FIG. 5, controller 330-1 includes control links with nodes 322-1, 322-2, and 322-3. Controller 330-2 includes control links with nodes 322-7, 322-8, and 322-9. Controller 330-3 includes control links with nodes 322-4, 322-5, and 322-6.

In this manner, the nodes are divided into three node partitions, also referred to as node clusters, with each partition including three network nodes. Similarly, the three controllers may be said to form a controller cluster for all of the network nodes. The use of multiple controllers may provide high availability by providing the capability of one controller to take over for another in the event of failure. Nodes 322-1, 322-3, and 322-3 form a node cluster controlled by controller 330-1. Nodes 322-7, 322-8, and 322-9 form a node cluster controller by controller 330-2, and nodes 322-4, 322-5, and 322-6 form a node cluster controller by controller 330-3.

In one embodiment, a node or device at a node only communicates with a single master controller. The node may have connections to other controllers, but only communicates with the master controller at a given point in time. If however, the master controller for the node fails, another controller connected to the node may take over control plane functions for the nodes controlled by the failed controller. For example, in response to an event indicating that controller 330-1 has failed, control of nodes 322-1, 322-2, and 322-3 may shift to controller 330-2.

Figure 6:
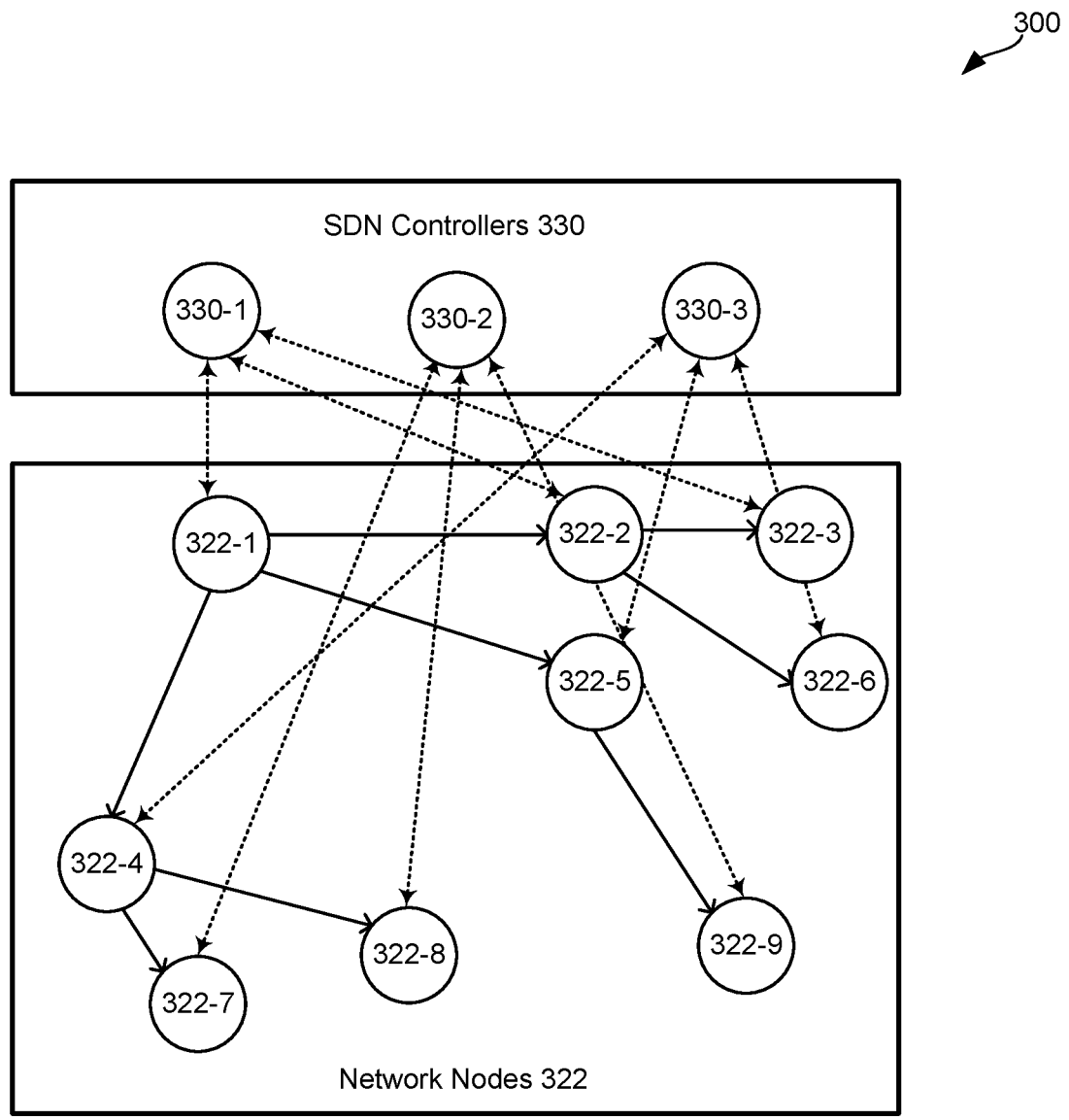
FIG. 6 is a block diagram of an example of a network environment including nodes in a tree topology.

FIG. 6 is a block diagram that continues with the example of an SDN 300 including an access network as shown in FIG. 5. In FIG. 6, the physical topology including connecting links between the intermediate nodes of the access network is shown. An examination of the node and link structure reveals a common attribute of access networks, namely a tree topology having at least one root node through which data for one or more downstream nodes passes.

In FIG. 6, node 322-1 is a root node for each of the other nodes. A tree topology is formed with root node 322-1 and the downstream nodes. FIG. 6 has five individual connecting paths originating at root node 322-1. A first branch of the tree includes downstream nodes 322-2 and 322-3. A second branch of the tree includes downstream nodes 322-2 and 322-6. A third branch of the tree includes downstream nodes 322-5 and 322-9. A fourth branch of the tree includes downstream nodes 322-4 and 322-7. A fifth branch of the tree includes downstream nodes 322-4 and 322-8.

In a tree topology as illustrated, the full set of nodes is not interconnected as in many architectures, such as the mesh architecture shown in FIG. 1. With a tree topology, an access network can distribute user traffic from a root node of the tree down to the leaf or end nodes. The root node can be considered the base of the tree, with connections that branch out in a tree-like manner to additional nodes, including intermediate nodes and culminating with leaf nodes at the top of the tree. Similarly, the access network can aggregate user traffic from the leaf nodes at a root node. The root node may connect the leaf nodes to a service provider. The root node may be connected to a server at the service provider or to an external network.

The branches do not have connecting edges and thus, do not communicate directly. Instead, the braches communicate through one or more intermediate connecting nodes. For example, the leaf nodes in each branch have no direct connecting links. Accordingly, communication between a leaf node and the root node must pass through an intermediate node.

Traditionally, networks or subnetworks having a tree topology have been modeled as a special node in an overall network description. For example, controllers designed to perform control and management functions for optical line terminals (OLTs) have typically modeled tree topologies, as in access networks for example, as a switch. A layer 2 switch model with ingress ports and egress ports has been used. In this view, the access network aggregates upstream traffic while distributing downstream traffic. This view uses a simplified data structure to generate a description for an access network. While simple, this type of model hides or does not expose intermediate nodes or connecting links in the access network. Access to and/or manipulation of intermediate nodes and connecting links in the access network is not possible.

FIG. 7 is a table showing an example of a network model that may be used to create a network description for a network controller to manage an SDN. The network model provides a modularized description for a network topology. The description includes two models, a link model, "augment/nd:networks/nd:network:" and a node model "augment/nd:networks/nd:network/nd:node:". In the structure of the model, brackets enclose list keys. The notation "rw" refers to configuration data, "ro" refers to operational state data, and "?" designates optional nodes. The notation "+" indicates a line break.

With such models, descriptions are generated for each node in the network, as well as for each link between nodes. With reference to FIG. 6, for example, nine node descriptions may be generated to describe nodes 322 and eight link descriptions may be generated to describe the links between each of the nodes 322. The node descriptions may be stored in a node data store and the link descriptions may be stored in a link data store.

The node model includes a plurality of fields for the corresponding node. A network termination point field includes an identifier "tp-id." A supporting-termination-point field includes identifiers "network-ref," "node-ref," and "tp-ref."

The link model includes a plurality of fields that describe the corresponding link. A link field includes an identifier "link-id." A source node field includes an identifier "rw source-node" of the source node of the link and an identifier "rw source-tp". A destination node field includes an identifier "rw dest-node" of the destination node of the link and an identifier "rw dest-tp." A link identifier field includes an identifier "link-id" of the link. A supporting link field includes an identifier "rw network-ref" that identifies the network of the link, and an identifier "rw link-ref" that identifies that reference link.

A network description generated from the data model shown in FIG. 7 may have several drawbacks. The node descriptions may be stored in a node data store and the link descriptions may be stored in a link data store.

As earlier described, a data path calculation will access the link descriptions to determine a path between a source node and a destination node. The controller will search all of the node descriptions associated with each of the link descriptions to calculate a path. This repetitive process may be time-consuming and inefficient. For example, the controller may place the node store information and the link store information into memory. The source-destination route can then be complicated using a complexity of $O(n\hat{+}2)$.

FIG. 7 also illustrates that typical network models may not recognize and model the tree structure present in many networks. For a given node, the downstream nodes are not identified, nor is information about the given node and its parent node identified. In this fashion, a more complicated model is provided that may not accurately reflect the true topology of many networks.

In accordance with one embodiment, a network model is provided that identifies and describes the tree topology of a network such as an access network. By modeling an SDN as a tree, the intermediate nodes between edge nodes of the network, or between an edge node and an external network are exposed. The tree topology identifies the intermediate nodes within an access network in one embodiment. This may include exposing nodes that include ONU's or FTU's, for example, which are typically hidden in an SDN description. Additionally, the connecting links between edge nodes and intermediate nodes, or between intermediate nodes are exposed in the description. From a data structure point of view, a tree structure can be modeled more simply than as a graph as in many modeling architectures.

Figure 8:
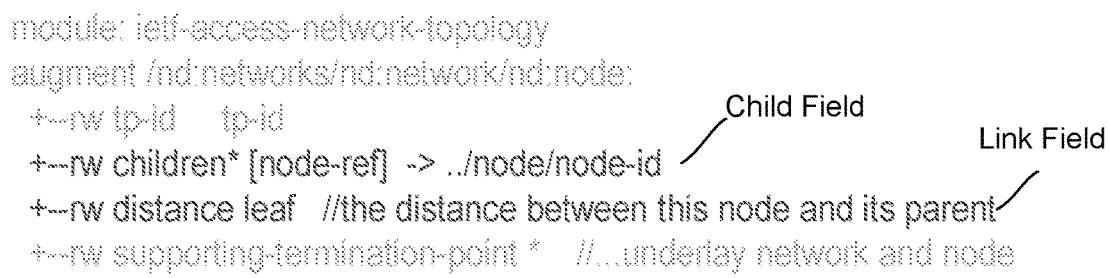
FIG. 8 is a flowchart describing one embodiment of a process of generating a network configuration.

FIG. 8 is a table depicting a data structure for a network model including a child field and a link field in accordance with one embodiment. The network model indicates that it describes a modularized access network topology, but the network model may be used to model nodes in any network having a tree-based node structure. The network model indicates that it augments a network configuration, identifying the network and the node "nd." The node model includes an identifier "tp-id" identifying a termination point of the node and an identifier tp-ref for a supporting termination point of the node, including an underlay network and node.

Notably, the model in FIG. 8 does not include a separate link model as shown in FIG. 7. The link model is deleted from the network model in FIG. 8. Additionally, fields are added that allow the tree structure of an access network to be accurately and simply described. In this manner, the network can be fully described use one node data store. In particular, the node model includes additional fields "children" and "distance." The additional fields are added at the "termination-point" portion of the model. The "children" field identifies the direct connecting nodes of node nd other than the parent node of node nd. The child field includes an identifier "node-id" that identifies the child nodes of the node nd. The identifier "node-ref" may identify the modeled node. The link field "distance" indicates a distance (e.g., km) between the selected node and its parent node. Although not shown, the link field may optionally identify the parent node. With the fields "children" and "distance" the full topology information about an entire access network can be determined in the time complexity of $O(n)$, wherein n is the total number of nodes in the tree.

In one embodiment, the node model can additionally include a parent field which refers to the parent node id of the selected node. With the parent node id, the route from a leaf node to a root node can be determined with a complexity of $O(\log(n))$, where n is the total number of nodes in the tree. This can be contrasted with a graph-based model, where a link store and a node store must be placed in memory and used to calculate a source-destination route with a complicated algorithm having a complexity of O(n+2).

By fully describing a network using a single node data store, updates to a network configuration are simplified. For example, if a device in the network is updated (e.g., goes down), a single database manipulation is involved. Similarly, consider the situation of adding a device and its n−1 children. Using the network model in FIG. 9, n nodes are updated in the node data store to add the devices to the network description. By contrast, in a graph-based model as shown in FIG. 7, n nodes would be updated in the node data store, and n links would be updated in the link data store. The time complexity provided by FIG. 9 is half of that provided by FIG. 7.

Figure 9:
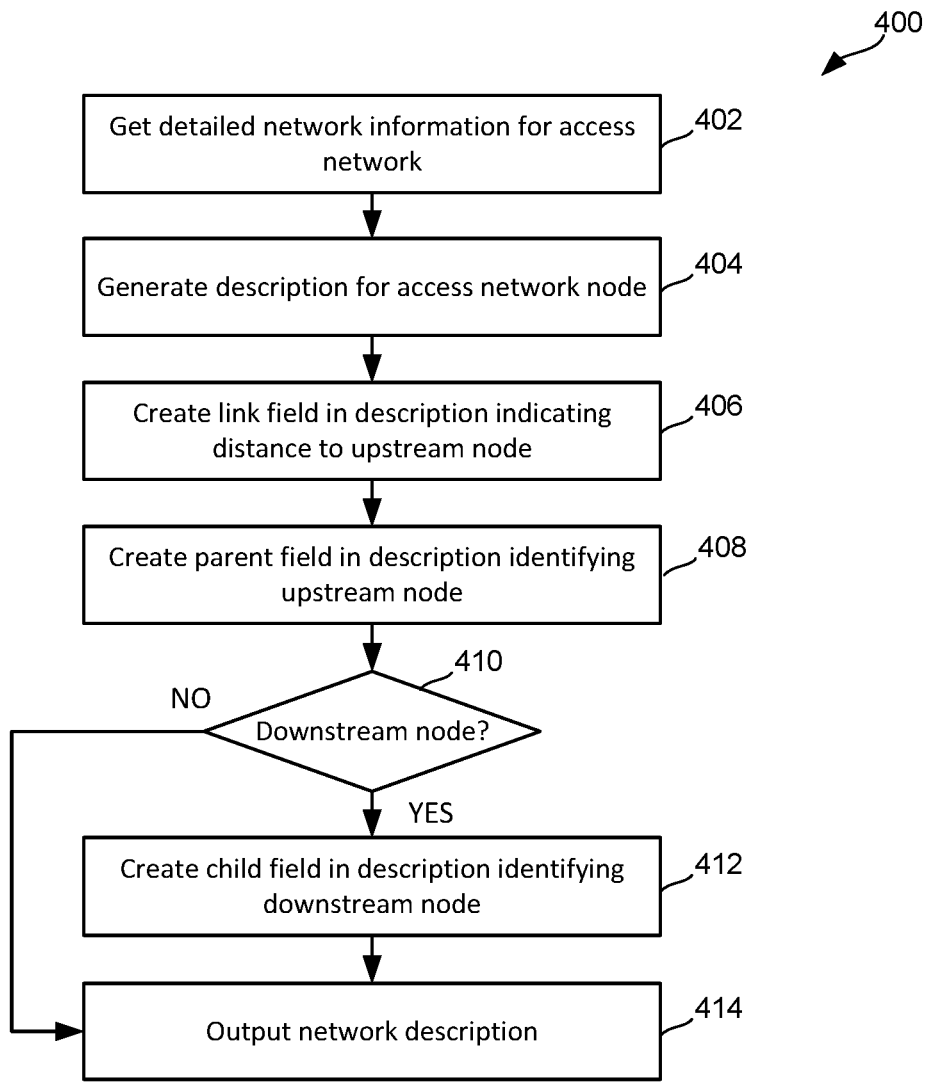
FIG. 9 is a table depicting a data structure for a node model including a child field and a link field in accordance with one embodiment.

FIG. 9 is a flowchart describing one embodiment of a process 400 of generating a network description. Process 400 may include generating one or more node descriptions including child and/or link descriptions representing a tree topology of a network such as an access network. Process 400 may be performed in network environments such as environments 10, 50, 100, 200, and 300. Process 400, however, is not limited to being performed in such environments. Process 400 may be implemented in or by a server or other computing device to generate a network description and configure the network. Process 400 may be performed by a controller for an SDN such as a control plane controller 30, central controller 40, or SDN controller 130, 230, or 330. A controller may be a dedicated controller, or may be implemented as a network management system, for example. In one embodiment, process 400 may be performed by a device at a node 322. The controller may be implemented as one or more circuits, in a specialized network device such as a router, for example. Alternatively, the process may be implemented in a processor, as processor readable code for programming a process for example.

At step 402, detailed network information for an access network is accessed. In one example, physical topology information can be accessed. A server for the SDN accesses the physical topology information in one embodiment. Physical topology information may be accessed by receiving one or more messages form the network nodes in one example. In another example, the information may be accessed by polling one or more network nodes or accessing one or more data stores containing the physical topology information. Physical topology information is information that describes the infrastructure and connections within the SDN, as well as connections to any external networks. Network information can be accessed for a selected node at step 402. The network information may include physical topology information for the node. The information may include link information and information pertaining to nodes connected to the selected node.

At step 404, the server generates a node description for a node of the access network based on a node model. Step 404 includes using the detailed network information such as the physical topology information from step 402.

The node description may be used as part of a network description to manage control plane functions of an SDN. A controller for the SDN generates the network description in one embodiment. A network description may include a tree topology definition for all or a portion of the SDN. The tree topology definition may be based on network information using a software-defined configuration from modeling or using manual configuration. Traffic distribution patterns, site configurations, and packet layer protection and traffic engineering rules may be used to generate a network description.

In one embodiment, the node description may include an identifier for the node, an identifier of a termination point for the node, and/or an identifier of a supporting termination point which may identify an underlay network and node.

At step 406, a link field for the node description is created if the selected node is not a root node. The link field includes an indication of the physical distance (e.g., km) between the selected node and its parent node. At step 408, a parent field is created for node description. Step 408 is optional. The parent field includes an identifier of the parent node of the selected node. It is noted that steps 406 and 408 are omitted for the root node of the tree since the root node has no upstream node.

At step 410, the server determines whether there are any downstream nodes with a connecting link to the selected node. If the selected node has a downstream node, a child field is created for the node description at step 412. The child field includes an identifier of the child node in one embodiment. The child field may include additional information, such as information pertaining to the link between the selected node and child node. In one embodiment, step 412 includes creating a child field for every downstream node having a direct connecting link to the selected node.

Process 400 can be repeated until each node of a tree structure has been described. The server determines if there are additional nodes in the SDN to be described. In one embodiment, process 400 begins with the root node and proceeds in a downstream direction until all nodes in the tree structure are described. After describing each node in the tree structure, the process can repeat beginning with another root node in the access network. In one embodiment, a node description is generated for every network node in the access network. In another embodiment, a node description is generated for a subset of nodes in the SDN. After all nodes have been described, the server outputs the network configuration including the description of each node at step 414. A network description may be output in any suitable format. For example, a network description may include a table, schematic, diagram, flat file, network configuration file and combination of these. A network description file, for example, may be used by multiple controllers to configure a software-defined network. Configuring the network may include establishing and configuring data flow paths through an optical, packet, and/or any other suitable network.

FIG. 10 is a block diagram depicting one example of a software-defined access network having nodes modeled according to their physical tree topology. One or more controllers 530 are depicted that manage control plane functions for a set of nodes 522 In this example, the access network includes a number of network nodes 522 that form three network tree structures. Control links between the controller and network nodes 522 are not shown.

The controller interfaces with a network description 550, which may be stored in memory and accessed by the controller. The network description includes node descriptions 552 for the plurality of nodes 522 in the SDN 500. Where appropriate a node description for a node includes one or more child fields 554 to identify one or more downstream nodes relative to the modeled node, and a link field 556 to identify an upstream nodes relative to the modeled node.

A first tree structure includes a root node 522-1 that includes an optical line terminal. The first tree structure includes two child nodes (OLT) 522-2 and 522-3, both including an optical network terminal (ONT).

A second tree structure includes a root node 522-4 that includes an optical line terminal. Root node 522-4 is connected to downstream intermediate nodes 522-5 and 522-8. Nodes 522-5 and 522-8 each include an optical line unit (OLU)+fast transmission unit (FTU-O). Intermediate node 522-5 is connected to downstream nodes 522-6 and 522-7. Intermediate node 522-8 is connected to downstream node 522-9. Nodes 522-6, 522-7, and 522-9 may each include an FTU-R.

A third tree structure includes a root node 522-10 that includes an FTU-O and two downstream nodes 522-11 and 522-12, each including an FTU-R.

With a tree-based network description created for the network using a node model as described, the intermediate nodes 522-5 and 522-8 and each of the connecting links in the access network are exposed. Controllers 530 may directly access, control, and manage each of the connecting links and intermediate nodes. Moreover, applications may access the links and nodes for manipulation, etc. based on the network description including node and link fields as described. In one example, nodes 522-5 and 522-8 are intermediate nodes associated with internal communication of the access network. In one example, the remaining nodes are root and leaf nodes associated with carrier terminals or user equipment.

Figure 11:
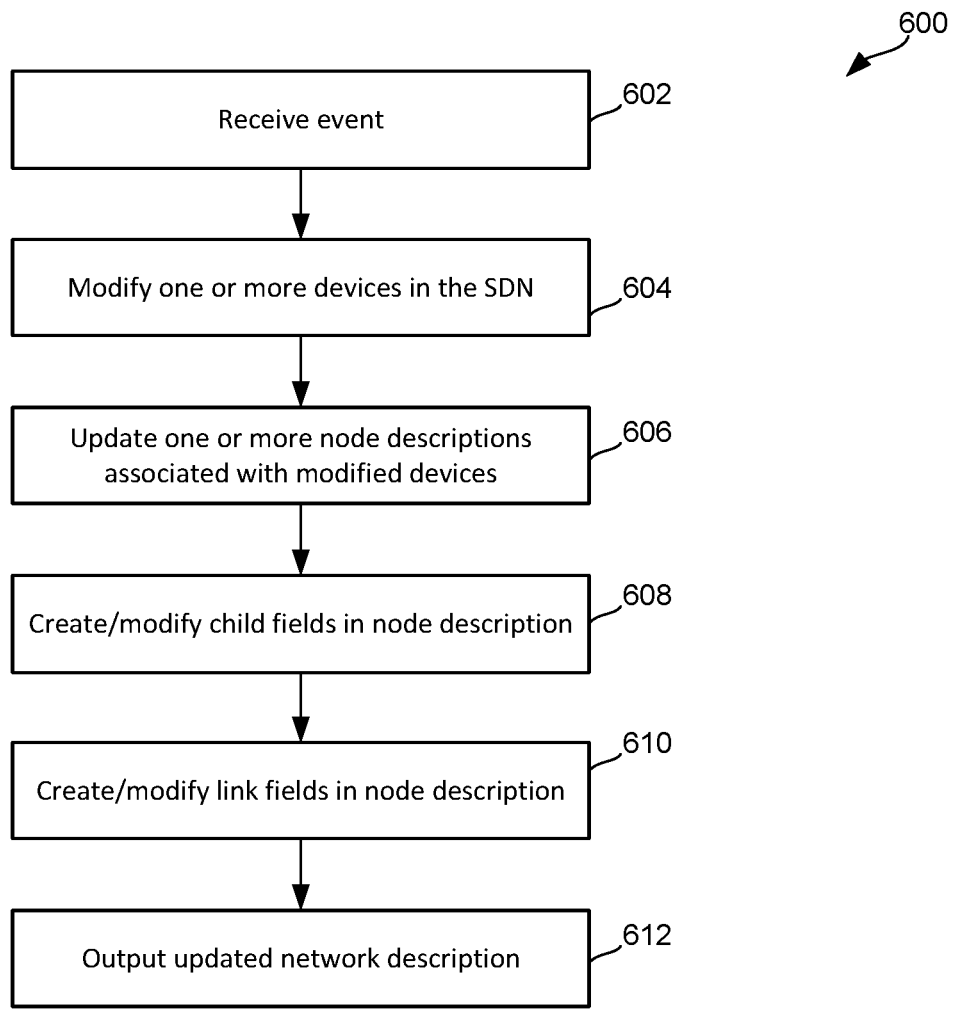
FIG. 11 is a flowchart describing one embodiment of a process of modifying a device.

FIG. 11 is a flowchart describing one embodiment of a process 600 of upgrading and/or modifying a device at a node in an SDN having a tree-based node model configuration. Process 600 may be performed in the network environments such as environments 10, 50, 100, 200, and 300. Process 600, however, is not limited to being performed in such environments. Process 600 may be implemented in or by a server or other computing device to modify a device and update a node model in one embodiment. Process 500 may be performed by a controller for an SDN such as a control plane controller 30, central controller 40, or SDN controller 130, 230, or 330. A controller may be a dedicated controller, or may be implemented as a network management system, for example. In one embodiment, process 500 may be performed by a device at a node 322. The controller may be implemented as one or more circuits, in a specialized network device such as a router, for example. Alternatively, the process may be implemented in a processor, as processor readable code for programming a process for example.

At step 602, the network controller at a server receives an event. The event may be a network event received from within the SDN or an event from an external network or device, such as a client or user equipment connected to the access network. A network event may be a message or information received indicating a change or status of the access network. A network event may indicate a current bandwidth use or availability, a device status (e.g., switch or router up or down), or any other information relating to the network. An event may also include a request from a client requesting a path computation or a request from a network component for a path computation.

At step 604, the controller modifies one or more devices in the SDN. Modifying a device may include modifying resources allocated to a device or network components such as links connected to a device at a node. The controller may modify a device by generating a data path using the connected device, and assigning resources of the device for creating the path. A data path including two or more nodes of the SDN may be configured based on a network description. The data path may include a source-destination path generated between a leaf node and a root node in response to a user request. For example, a path may be generated to create a connection between a client device and a service provider using the access network.

At step 606, the controller modifies one or more node descriptions in accordance with the device changes at step 606. The controller can modify a node description to indicate the capabilities of a node or device at a node after the changes.

At step 608, the node description may be updated to indicate new or altered downstream connections. The node description can be updated to indicate a change in the child nodes, for example. The changes may indicate a change in the set of resources associated with a child node, a new child node, or a removed child node. Step 608 can be performed as part of step 606 in one embodiment.

At step 610, the node description can be updated to indicate new or altered upstream connections. The node description can be updated to indicate a change in the link field, for example. The change may indicate a change in the set of resources associated with a parent node or that the parent node has been changed. Step 610 can be performed as part of step 606 in one embodiment.

At step 612, the controller outputs the network description including the updated node description (s). A network description output may be used to establish and configure a data flow path through an optical, packet, and/or any other suitable network in one embodiment.

FIG. 12 is a table depicting a data structure for a node model including a supplemental model field in accordance with one embodiment. As earlier described, the node model includes a network and node identifier, a termination point identifier, a supporting termination point identifier, a child field, and a link field. In addition, the node model of FIG. 12 includes a supplemental model field that identifies a supplemental model that further describes the node. In one embodiment, the supplemental model field identifies a yang model corresponding to type of device deployed at the node. The model field may include a pointer to the supplemental model which may be stored locally or remotely relative to the modeled node.

Figure 13:
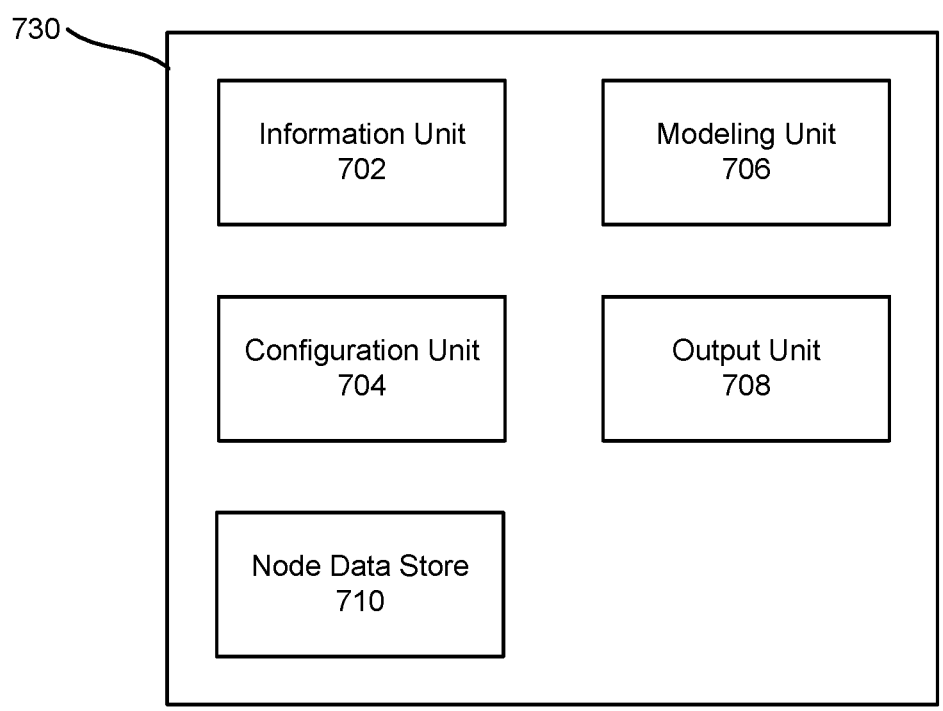
FIG. 13 is a block diagram of one embodiment of one or more servers.

FIG. 13 is a block diagram of one embodiment of one or more servers 730 for configuring a software-defined network (SDN) such as network nodes in an access network. In one embodiment, the server 730 may include a SDN controller. The server may alternately include an external controller or a dedicated controller for configuring an SDN. The server may also include a client device or other network device configured to as described. In certain embodiments, processes 400 and 600 may be performed based on server 730. The units may be implemented at a single server, or may be distributed across multiple servers.

The server includes an information unit 702, a configuration unit 704, a modeling unit 706, an output unit 708 and a node data store 710. The various units could be implemented with any combination of hardware and/or software.

In general, the information unit 702 may be configured to access information such as physical topology information for one or more SDNs to be modeled. Information unit 702 is one example of an information access means. Unit 702 is one example of a means for accessing information for a plurality of nodes and a plurality of links connecting at least a subset of the nodes.

Configuration unit 704 is configured to generate a network description for an SDN. Unit 704 is one example of a network configuration means. A network configuration may include resource assignments, data path calculations, and/or routing information for applications, data, and data packet flows through the network. The network description may comprise a network description in a file format as earlier described. Configuration unit 204 may further be configured to modify devices in the SDN based on events received by the controller.

Node modeling unit 706 is configured to generate a node description for one or more nodes in an SDN. Unit 706 is one example of a node modeling means. Unit 706 may be configured to generate a node description as part of a network description. Unit 706 may generate a node description including one or more child fields that define one or more downstream nodes relative to the node being modeled. The node description may also include a link field indicating a distance to an upstream parent node. Optionally, node modeling unit 706 may generate a parent field identifying the parent node relative to the modeled node. In one embodiment, the modeling unit is configured to add node descriptions to a network description for the SDN. In one embodiment, node modeling unit 706 is implemented as part of network configuration unit 704. Node modeling unit 706 may update a node description in response to events received from the SDN or outside of the SDN (e.g., from client devices).

Modeling unit 706 may further be configured to generate a supplemental reference field for a node description. The supplemental reference field can identify, such as by an address or other location identifier, a supplemental model to further describe the node. The reference field can point to a model for a particular device type in one embodiment.

Output unit 708 is configured to output a network description for use by at least one controller to manage control plane functions for an SDN. In one embodiment, output unit 708 outputs a network configuration file for storage in node data store 710. Unit 208 may also output the network description file to one or more controllers directly. In one example, a first controller includes the network configuration unit 704 and output unit 708 and outputs the network configuration to a second controller. In another example, a central controller includes the output unit and outputs the network configuration to the first and second controllers.

Node data store 710 may store a network description including node descriptions as previously described. Data store 710 can be implemented in any suitable format for maintaining network description information as described. Volatile or non-volatile memory may be used to maintain the network description in node data store 710. Data store 710 may be implemented in one or more physical devices. Data store 710 may be stored at one or more network nodes, and/or by a controller, including a central, master, or slave controller.

Figure 14:
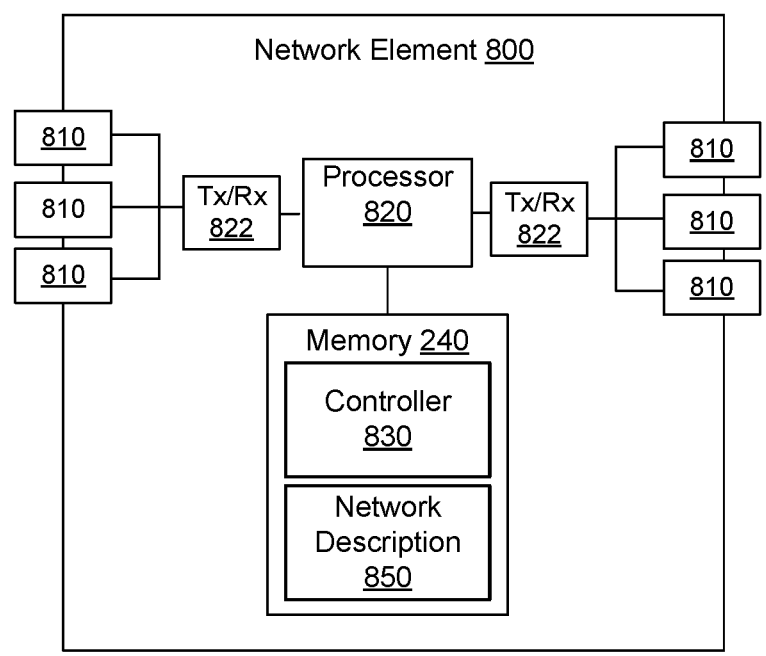
FIG. 14 is a block diagram of one embodiment of a network element.

FIG. 14 is a block diagram of one embodiment of a network element 800. Network element 800 may be suitable for implementing the disclosed embodiments. Network element 800 may be any device (e.g., a modem, a switch, router, bridge, server, client, controller, etc.) that transports or assists with transporting data through a network, system, and/or domain. For example, network element 800 may be used to implement user equipment 56, base station 58, controllers 30, 40, 130, 230, 330, 530, server 730, and nodes 22, 122, 124, 222, 322, and 522. Network element 800 may be used to implement other devices described herein.

Network element 800 comprises ports 810, transceiver units (Tx/Rx) 822, a processor 820, and a memory 840. The processor 820 is coupled to the memory 840 and to the Tx/Rx 822. Ports 810 are coupled to Tx/Rx 822, which may be transmitters, receivers, or combinations thereof. The Tx/Rx 822 may transmit and receive data via the ports 810. Processor 820 is configured to process data. Memory 840 is configured to store data and instructions for implementing embodiments described herein. In one embodiment, memory 840 implements server 730 and the various units described therein.

The network element 800 may also comprise electrical-to-optical (EO) components and optical-to-electrical (OE) components coupled to the ports 810 and Tx/Rx 822 for receiving and transmitting electrical signals and optical signals.

The processor 820 may be implemented by hardware and software. The processor 820 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 820 is in communication with the ports 810, Tx/Rx 822, and memory 840.

The memory 840 comprises one or more of disks, tape drives, and solid-state drives and may be used as an overflow data storage device, to store programs when such programs are selected for execution, and to store instructions and data that are read during program execution. The memory 840 may be volatile and non-volatile and may be read-only memory (ROM), random-access memory (RAM), ternary content-addressable memory (TCAM), and static random-access memory (SRAM). In one embodiment, memory 840 is used to implement controller 830 and/or network description 850. Controller 830 can comprise programming instructions, or routines capable of being executed by the processor 820 in one embodiment. Similarly, the information unit 702, configuration unit 704, modeling unit 706, and output unit 708 comprise programming, instructions, or routines capable of being executed by the processor 820 in one embodiment. The units may be implemented by processor 820 to execute the instructions for accessing network information and generating a network configuration based on the network information. The inclusion of server 730 or any one of the units described therein provide an improvement to the functionality of network element 800. These units effect a transformation of network element 800 to a different state.

Figure 15:
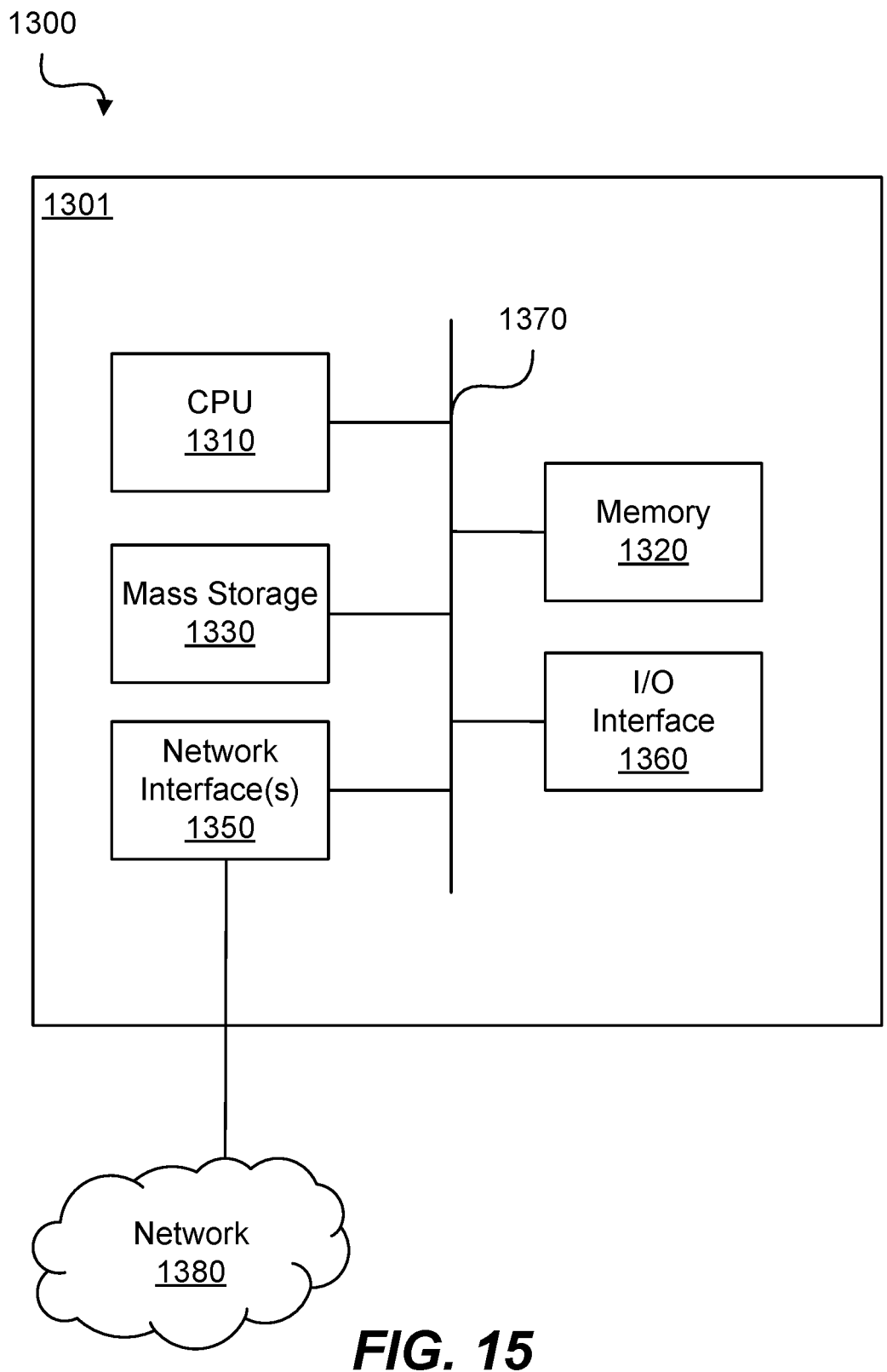
FIG. 15 is a high level block diagram of a computing system.

FIG. 15 is a high level block diagram of a computing system 1300 that can be used to implement various embodiments. In one example, computing system 1300 is a network system 1300. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like. Processing unit 1301 may be used to implement any of the computing devices described herein, such as a server, controller, and/or client device.

The CPU 1310 may comprise any type of electronic data processor. The CPU 1310 may be configured to implement any of the schemes described herein, such as processes 400 and 600 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit events, messages, data, routing information, etc. in an SDN. Herein, the term "network interface" will be understood to include a port.

The processing unit 1301 may be configured to implement any of the schemes described herein, such as the processes 400 and 600 using any one or combination of steps described in the embodiments.

The components depicted in the computing system of FIG. 15 are those typically found in computing systems suitable for use with the technology described herein, and are intended to represent a broad category of such computer components that are well known in the art. Many different bus configurations, network platforms, and operating systems can be used.

In a first example, there is a device, comprising a non-transitory memory storage comprising instructions; and one or more processors in communication with the memory, wherein the one or more processors execute the instructions to: access network information for an access network having a tree topology including a plurality of nodes and a plurality of links, wherein each pair of connected nodes of the plurality includes a single connecting link, each node being associated with at least one device; generate a network description for the access network based on a node model for a tree topology, the network description including for a first node at least one child field defining any downstream nodes relative to the first node and a link field defining a distance between the first node and an upstream node to which it is connected; and store the network description for access by at least one controller to manage control plane functions in the access network.

In a second example, according to the first example, the one or more processors execute the instructions to access from a node data store the network description; calculate a source-destination path between two nodes of the plurality based on the network description; and wherein calculating the source-destination path includes determining link information between nodes in the source-destination path based on one or more link fields in the network description.

In a third example, according to any one of the first to second examples, the one or more processors execute the instructions to provide from a first controller configuration information for the source-destination path, wherein the configuration information is provided to a set of nodes in the source-destination path.

In a fourth example, according to any one of the first to third examples, calculating the source-destination path is performed without accessing a link data store to determine links between nodes in the access network.

In a fifth example, according to any one of the first to fourth examples, the plurality of nodes form a first tree structure having a root node.

In a sixth example, according to any one of the first to fifth examples, the node model includes a parent field for identifying an upstream node to which a selected node is connected.

In a seventh example, according to any one of the first to sixth examples, the access network is an access network for a wireless communication system; and the access network provides connectivity between a plurality of client devices and at least one external network.

In an eighth example, according to any one of the first to seventh examples, the one or more processors execute the instructions to receive at least one event associated with the access network and a first application, the at least one event identifying a first intermediate node and a first connecting link; and in response to the at least one event, manipulate the first intermediate node and the first connecting link.

In a ninth example, according to any one of the first to eighth examples, the one or more processors execute the instructions to receive at least one event associated with the access network; and in response to the at least one event, configure by a first controller a data path including two or more nodes of the plurality of nodes based on the network description.

In a tenth example, according to any one of the first to ninth examples, generating the network description includes providing at least one additional field referencing a supplemental model; and wherein the supplemental model is a device model corresponding to a device deployed at a first node.

In a eleventh example, according to any one of the first to tenth examples, the one or more processors execute the instructions to receive at least one event associated with the access network; modify at least one device in the access network based on the event; update the network description for one or more nodes associated with the at least one device; and updating the network description includes updating one or more link fields.

In a twelfth example, according to any one of the first to eleventh examples, the one or more processors execute the instructions to transmit the network description to a first controller at a first device and a second controller at a second device, the first controller controlling a first subset of nodes in the access network and the second controller controlling a second subset of nodes in the access network.

In a thirteenth example, according to any one of the first to twelfth examples, a centralized controller generates the network description and outputs the network configuration to the first controller and the second controller.

In a fourteenth example, a system comprises an access network comprising a plurality of nodes and a plurality of links between a subset of the nodes, each node is associated with at least one device, the access network providing connectivity between a plurality of client devices and a service provider; a processor coupled to the software-defined access network and configured to generate a node description for a first node of the software-defined access network, the node description defining at least one downstream node relative to the first node and indicating a distance between the first node and an upstream node; and a storage device configured to receive and store the node description for the first node.

In a fifteenth example, according to the fourteenth example, further comprising a controller coupled to the storage device; a control link between the controller and the first node; and wherein the controller is configured to receive a request and access the node description to perform a data path calculation including the first node.

In a sixteenth example, according to any one of the fourteenth to fifteenth examples, the processor is configured to generate the node description including providing at least one additional field referencing a supplemental model for the first node.

In a seventeenth example, according to any one of the fourteenth to sixteenth examples, the processor is configured to receive at least one event associated with the software-defined network; modify at least one device in the software-defined network based on the request; update a node description for one or more nodes associated with the at least one device; and wherein updating the node description includes updating one or more link fields.

In an eighteenth example, a computer-implemented method for network management, comprising providing an access network comprising a plurality of nodes and a plurality of links between a subset of the nodes, each node is associated with at least one device, the access network providing connectivity between a plurality of client devices and at least one external network; accessing by a controller a network description for the access network, the network description including a node description for each of the plurality of nodes, wherein the node description for each node includes a child field defining downstream nodes connected to the node and a link field defining a distance between the node and an upstream node; and generating by the controller a source-destination path between a leaf node and a root node in the access network in response to a client request, the controller configured to access the node description for at least the leaf node and the root node to determine connecting links based on link fields in the node description for the leaf node and the root node.

In a nineteenth example, according to the eighteenth example, further comprising receiving at the controller at least one event associated with the software-defined network; modifying, with the controller, at least one device in the software-defined network based on the request; updating, with the controller, the node description for one or more nodes associated with the at least one device; and wherein updating the node description includes updating one or more link fields.

In a twentieth example, a non-transitory computer-readable medium storing computer instructions for network management, that when executed by one or more processors, cause the one or more processors to perform the steps of access network information for a plurality of nodes and a plurality of links connecting at least a subset of the nodes, each node being associated with at least one device; generate a network description for a software-defined access network including a node description for each of the plurality of nodes, a first node description including at least one child field defining at least one downstream node relative to a first node, the first node description including a link field indicating a distance between the first node and an upstream node; and output the network description for use by at least one controller to manage control plane functions for the software-defined network.

In a twenty-first example, according to the twentieth example, generating the network description includes generating at least one additional field referencing a supplemental model.

In a twenty-second example, according to the twentieth to twenty-first examples, the one or more processors perform the step of configure by a first controller a data path including two or more nodes of the plurality of nodes based on the network description.

The technology described herein can be implemented using hardware, software, or a combination of both hardware and software. The software used is stored on one or more of the processor readable storage devices described above (e.g., memory 1320 or mass storage 1330) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers. In embodiments, the term "unit" may include a circuit (or integrated circuit) or software component.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A device, comprising:
a non-transitory memory storage comprising instructions; and
one or more processors in communication with the memory, wherein the one or more processors execute the instructions to:
access network information for an access network having a tree topology including a plurality of nodes and a plurality of links, wherein each pair of connected nodes of the plurality of nodes includes a connecting link, each node being associated with at least one device;
generate a network description for the access network that models each of the nodes in the access network as a tree topology, the network description including for each node in the access network at least one child field defining downstream nodes relative to a respective node and a link field defining a distance between the first respective node and an upstream node to which it is connected thereby forming a connecting link; and
store the network description in a node data store for access by at least one controller to manage control plane functions in the access network by accessing the connecting links and the downstream nodes.

2. The device of claim 1, wherein the one or more processors execute the instructions to:
access from the node data store the network description;
calculate a source-destination path between two nodes of the plurality of nodes based on the network description; and
wherein calculating the source-destination path includes determining link information between nodes in the source-destination path based on one or more link fields in the network description.

3. The device of claim 2, wherein the one or more processors execute the instructions to:
provide from a first controller configuration information for the source-destination path, wherein the configuration information is provided to a set of nodes in the source-destination path.

4. The device of claim 3, wherein:
calculating the source-destination path is performed without accessing a link data store to determine links between nodes in the access network.

5. The device of claim 1, wherein:
the plurality of nodes form a first tree structure having a root node.

6. The device of claim 5, wherein:
the the network description of the modeled nodes include a parent field for identifying an upstream node to which a selected node is connected.

7. The device of claim 1, wherein:
the access network is an access network for a wireless communication system; and
the access network provides connectivity between a plurality of client devices and at least one external network.

8. The device of claim 7, wherein the one or more processors execute the instructions to:
receive at least one event associated with the access network and a first application, the at least one event identifying one of the downstream nodes and a corresponding connecting link; and
in response to the at least one event, manipulate the downstream node and the corresponding connecting link.

9. The device of claim 1, wherein the one or more processors execute the instructions to:
receive at least one event associated with the access network; and
in response to the at least one event, configure by a first controller a data path including two or more nodes of the plurality of nodes based on the network description.

10. The device of claim 1, wherein generating the network description includes:
providing at least one additional field referencing a supplemental model; and
wherein the supplemental model is a device model corresponding to a device deployed at a first node.

11. The device of claim 1, wherein the one or more processors execute the instructions to:
receive at least one event associated with the access network;
modify at least one device in the access network based on the event; and
update the network description for one or more nodes associated with the at least one device, wherein updating the network description includes updating one or more link fields.

12. The device of claim 1, wherein the one or more processors execute the instructions to:
transmit the network description to a first controller at a first device and a second controller at a second device, the first controller controlling a first subset of nodes in the access network and the second controller controlling a second subset of nodes in the access network.

13. The device of claim 12, wherein:
a centralized controller generates the network description and outputs the network configuration to the first controller and the second controller.

14. A system, comprising:
an access network comprising a plurality of nodes and a plurality of links between a subset of the nodes, each node is associated with at least one device, the access network providing connectivity between a plurality of client devices and a service provider;
a processor coupled to the access network and configured to generate a node description for each node of the access network, the node description defining at least one downstream node relative to the each node and indicating a distance between each node and an upstream node to which it is connected and forms a connecting link; and
a storage device at a data node configured to receive and store the node description for the each node for access by at least one controller to manage control plane functions in the access network by accessing the connecting links and the downstream nodes.

15. The system of claim 14, further comprising:
the at least one controller coupled to the storage device;
a control link between the controller and each node; and
wherein the at least one controller is configured to receive a request and access the node description to perform a data path calculation including each node.

16. The system of claim 14, wherein the processor is configured to generate the node description including:
providing at least one additional field referencing a supplemental model for each first node.

17. The system of claim 14, wherein the processor is configured to:
receive at least one event associated with the access network;
modify at least one device in the access network based on the request;
update a node description for one or more nodes associated with the at least one device; and
wherein updating the node description includes updating one or more link fields.

18. A computer-implemented method for network management, comprising:
providing an access network comprising a plurality of nodes and a plurality of links between a subset of the nodes, each node is associated with at least one device, the access network providing connectivity between a plurality of client devices and at least one external network;
accessing by a controller a network description for the access network, the network description, stored in a node data store, including a node description for each of the plurality of nodes, wherein the node description for each node in the access network includes a child field defining downstream nodes connected to the node and a link field defining a distance between the node and an upstream node to which it is connected to thereby form a connecting link; and
generating by the controller a source-destination path, and for modeling each of the nodes in the access network as a tree topology, the source-destination path, between a leaf node and a root node in the access network in response to a client request, the controller configured to access the node description for at least the leaf node and the root node to determine connecting links based on link fields in the node description for the leaf node and the root node.

19. The computer-implemented method of claim 18, further comprising:
receiving at the controller at least one event associated with the access network;
modifying, with the controller, at least one device in the access network based on the request;
updating, with the controller, the node description for one or more nodes associated with the at least one device; and
wherein updating the node description includes updating one or more link fields.

20. A non-transitory computer-readable medium storing computer instructions for network management, that when executed by one or more processors, cause the one or more processors to perform the steps of:
access network information for a plurality of nodes and a plurality of links connecting at least a subset of the nodes, each node being associated with at least one device;
generate a network description for a access network that models each of the nodes in the access network as a tree topology, the network description including a node description for each of the plurality of nodes, each node description including at least one child field defining at least one downstream node relative to each node, each node description including a link field indicating a distance between the first node and an upstream node to which it is connected thereby forming a connecting link; and
output the network description for use by at least one controller to manage control plane functions for the access network by accessing the connecting links and the downstream nodes.

21. The non-transitory computer-readable medium of claim 20, wherein generating the network description includes:
generating at least one additional field referencing a supplemental model.

22. The non-transitory computer-readable medium of claim 20, wherein the one or more processors perform the step of:
configure by a first controller a data path including two or more nodes of the plurality of nodes based on the network description.

* * * * *

UNITED STATES PATENT AND TRADEMARK OFFICE
CERTIFICATE OF CORRECTION

PATENT NO. : 10,554,500 B2
APPLICATION NO. : 15/725035
DATED : February 4, 2020
INVENTOR(S) : J. Zhang et al.

It is certified that error appears in the above-identified patent and that said Letters Patent is hereby corrected as shown below:

On the Title Page

Item (56), Page 2/References Cited, Line 29, please change "D?Souza" to --D'Souza--.

In the Claims

Column 24, Line 22 (Claim 6, Line 2), please change "the the" to --the--.

Signed and Sealed this
Twenty-first Day of July, 2020

Andrei Iancu
*Director of the United States Patent and Trademark Office*